United States Patent [19]

Hunt et al.

[11] Patent Number: 4,974,452
[45] Date of Patent: Dec. 4, 1990

[54] HOMOGENIZING AND METERING THE FLOW OF A MULTIPHASE MIXTURE OF FLUIDS

[75] Inventors: Andrew Hunt, Royston; Leslie Bradbury, Noss Mayo, both of England

[73] Assignee: Schlumberger Technology Corporation, Houston, Tex.

[21] Appl. No.: 523,283

[22] Filed: May 14, 1990

[30] Foreign Application Priority Data

Feb. 21, 1986 [GB] United Kingdom ............... 8604398

[51] Int. Cl.$^5$ .................................... G01F 1/445
[52] U.S. Cl. ......................... 73/861.64; 73/61.1 R; 73/155; 73/198; 73/861.04; 137/896
[58] Field of Search ............... 73/861.64, 861.63, 195, 73/198, 861.51, 3, 151, 155, 61.1 R, 861.04, 861.01, 861; 137/3, 896; 366/150, 163, 176, 154, 341, 342, 336; 138/39, 42

[56] References Cited

U.S. PATENT DOCUMENTS

| | | | |
|---|---|---|---|
| 3,930,742 | 1/1976 | Boyce | 73/861 |
| 4,127,332 | 11/1978 | Thiruvengadam et al. | 366/176 |
| 4,168,624 | 9/1979 | Pichon | 73/195 |
| 4,231,262 | 11/1980 | Boll et al. | 73/861.04 |
| 4,312,234 | 1/1982 | Rhodes et al. | . |
| 4,335,965 | 6/1982 | Faverty et al. | 366/176 |
| 4,416,610 | 11/1983 | Gallagher, Jr. | 366/150 |
| 4,430,251 | 2/1984 | Patterson et al. | . |
| 4,450,715 | 5/1984 | Sumal | 73/198 |
| 4,528,847 | 7/1985 | Halmi | 73/861.64 |
| 4,576,043 | 3/1986 | Nguyen | 73/861.04 |
| 4,641,535 | 2/1987 | Malguarnera | 73/198 |
| 4,651,572 | 3/1987 | Albertz et al. | . |
| 4,856,344 | 8/1989 | Hunt | 73/861.04 |

FOREIGN PATENT DOCUMENTS

| | | | |
|---|---|---|---|
| 142503 | 7/1980 | Fed. Rep. of Germany | . |
| 1453706 | 9/1966 | France | 73/861.63 |
| 0151517 | 9/1983 | Japan | 73/861.04 |
| 0046721 | 10/1985 | Japan | 73/861.01 |
| 1089203 | 11/1967 | United Kingdom | . |
| 1552476 | 9/1979 | United Kingdom | . |
| 1601699 | 11/1981 | United Kingdom | . |
| 2085597 | 4/1982 | United Kingdom | . |
| 2124781 | 2/1984 | United Kingdom | . |
| 2128756 | 5/1984 | United Kingdom | . |

*Primary Examiner*—Joseph A. Orsino
*Assistant Examiner*—Brent A. Swarthout
*Attorney, Agent, or Firm*—Henri Dupont; John J. Ryberg

[57] ABSTRACT

It is often desirable to meter multiphase fluid flow in pipes (e.g. bore holes). In order to obtain reliable/accurate flow rate measurements it is known to incorporate obstructions in the flow path to cause homogenization. A non-obstructive method of homogenizing the flow of a multiphase mixture of fluids in a bore hole comprises providing in the bore hole a pipe section which has an internal surface with a step discontinuity, whereby when fluid flows through the pipe section, turbulent stresses are caused by the discontinuity, leading to homogenization by turbulent mixing. There is disclosed a flow meter which comprises a pipe length with a first section having a step change in cross-section for homogenizing fluid flow therethrough, in series with a venturi flow meter in which a differential pressure can be measured in a second pipe section having a smooth change in cross-section. Non-obstructive homogenizers and flow meters do not block the passage of objects such as tools, logging devices, etc along a pipe.

10 Claims, 1 Drawing Sheet

HOMOGENIZING AND METERING THE FLOW OF A MULTIPHASE MIXTURE OF FLUIDS

This is a continuation of application Ser. No. 017,463 filed Feb. 20, 1987, now abandoned.

FIELD OF THE INVENTION

The present invention relates to a method and apparatus for homogenizing the flow of a multiphase mixture of fluids, and to a flow meter with an associated homogenizer.

It is often desirable to monitor or meter the flow of fluids in pipes such as bore holes. Various methods for flow rate determination are known in the art : two examples are (i) the use of a turbine flow meter which is positioned in the flow path and which spins at a rate proportional to the fluid flow past it, and (ii) the use of a venturi flow meter which allows calculation of flow rate from measurement of the differential pressure across a region in which the flow is constricted.

In attempting to meter multiphase fluid flow, a major problem is that of slippage between the phases. Slippage is a velocity difference between component phases of the flow and is generally caused by buoyancy forces acting on fluid bubbles or drops or solid particles in the flow. It is dependent on flow history and pipe geometry. If slippage occurs in the flow of a multiphase mixture of fluids, components of the mixture will flow with different velocities, and the results of flow metering will be unreliable and/or inaccurate.

BACKGROUND

A steady flow (i.e. a flow which is self-preserving in mean properties) will develop naturally in a pipe of length equivalent to hundreds of pipe diameters, but such pipe lengths are impractical in many flow metering applications. In order to obtain a more reliable flow rate measurement it is known to incorporate in the flow path devices which reduce or eliminate slippage by causing homogenization or mixing of the fluid. Such homogenizers normally take the form of grids or shaped obstacles in the flow path and cause turbulent mixing of the constituent phases. Whilst such known homogenizers allow more reliable downstream flow measurements to be taken, they are flow obstructive and hence are subject to erosion and liable to cause plugging of the flow path. Furthermore, the presence of this type of homogenizer in the flow path prevents the passage of tools etc. along the pipe. The use of obstructive homogenizers in bore holes leads to long periods of downtime, which is economically costly and operationally inconvenient.

SUMMARY OF THE INVENTION

In one aspect of the present invention there is provided a method of homogenizing the flow of a multi-phase mixture of fluids in a bore hole, which comprises providing in the bore hole a pipe section which has an internal surface with a step discontinuity, whereby when fluid flows through the pipe section, turbulent stresses are caused by the discontinuity, leading to homogenization by turbulent mixing. The step discontinuity is a change in internal diameter from an initial diameter d to a larger diameter D.

Use of the invention allows more reliable downstream flow measurements to be taken because slippage between the component phases is reduced or eliminated. The pipe section is non-obstructive to flow; this has the advantage that it is less prone to erosion or to plugging of the flow path than conventional homogenizers.

In a second aspect of the invention there is provided a flow meter comprising a pipe length with a first section having a step change in cross-section for homogenizing fluid flow therethrough, in series with a venturi flow meter in which a differential pressure can be measured in a second pipe section having a smooth change in cross-section.

BRIEF DESCRIPTION OF THE DRAWINGS

An embodiment of the invention will now be described in detail, by way of example, with reference to FIG. 1.

BRIEF DESCRIPTION OF THE PREFERRED EMBODIMENT

Figure 1:
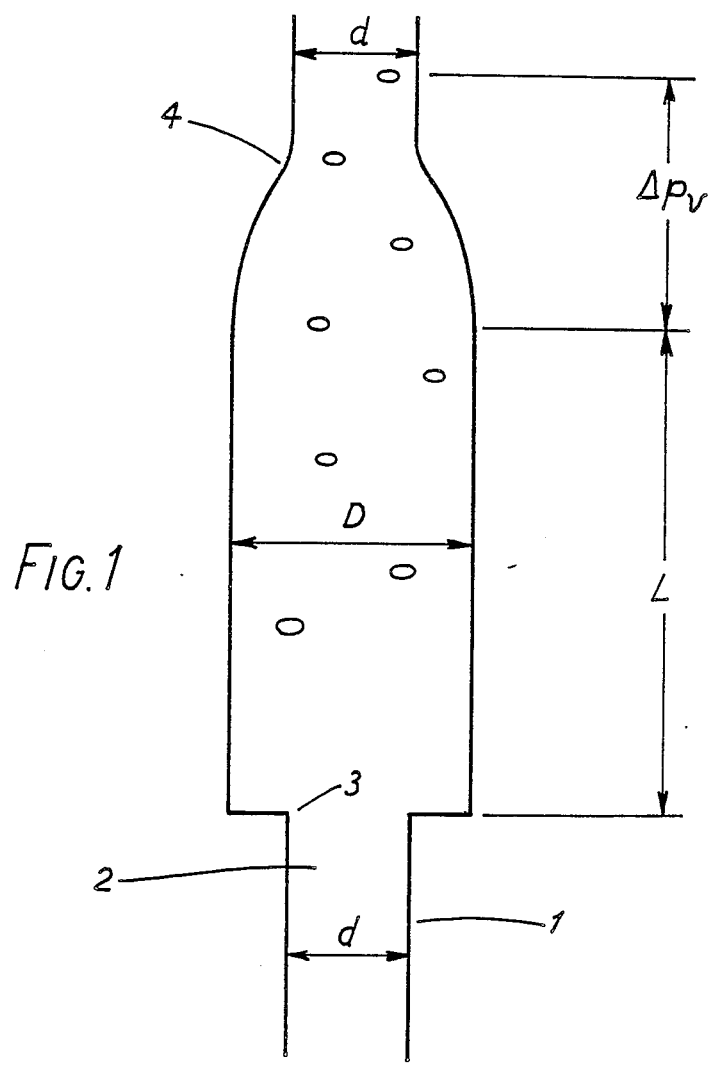

A pipe 1 has internal diameter d. The pipe carries a flow of a multiphase mixture of fluids, the direction of flow being from bottom to top of the FIGURE. At a point 3 there is a step change in diameter of the pipe from initial diameter d to larger diameter D. In this example D is in the range 1.2 to 2.5 d. The sudden increase in cross-sectional area of the pipe generates turbulent stresses in the flow which mixes the phases and breaks up large bubbles, drops etc. A pseudo-homogenous flow develops and stabilizes over a pipe length L of, for example, between 5 and 20 D. This provides homogenization of the flow over a considerably shorter pipe length than would be necessary to establish repeatable measurements in a pipe with a smooth internal surface.

A venturi flow meter, of known type, is provided downstream of the homogenizer. The venturi constricts the diameter from the diameter D back to the initial diameter d. Since slippage is reduced or eliminated by the non-obstructive homogenizer the pressure differential $\Delta p_v$ measured across the venturi will allow flow rates to be calculated (by the application of Bernoulli's equation) which are more accurate and/or reliable than those obtainable with the flow meter alone.

The flow meter of the present invention incorporates a homogenizer which overcomes the problems of obstruction and reduced flow area associated with previous homogenizers. Since the flow meter itself is non-obstructive it can remain in situ whilst other operations are carried out in the pipe—for example tools may be passed along the pipe. The flow meter is robust and since it does not obstruct the flow in the pipe, it is not susceptible to erosion and wear.

The method of using a non-obstructive homogenizer for homogenizing the flow of a multi-phase mixture of fluids in a bore hole is particularly advantageous in the oil/gas industry where the fluid flow is e.g. oil/gas or oil/water. During drilling, testing and production of an oil well many operations may need to be carried downhole (e.g. drill stem testing, wire-line logging, etc.) in addition to homogenization and flow metering. The use of the present method eliminates the down-time associated with installing and subsequently removing an obstructive homogenizer from a bore hole.

We claim:

1. A method of homogenizing the flow of a multiphase mixture of fluids in a bore hole without imposing a physical obstruction to the flow of the fluid, which comprises:

A. providing in the bore hole a pipe having a first section which has an internal surface with an initial diameter, a step discontinuity consisting of a change from said initial diameter to a larger diameter immediately adjacent to said first section, and a second section having an internal surface with said larger diameter immediately adjacent to said step discontinuity, said first section of a pipe being free of physical obstructive to said fluid flow;

B. establishing fluid flow of said multiphase fluid through the pipe in the direction from said first section to said second section; and C. homogenizing said fluid by imposing turbulent stresses caused by said discontinuity on said fluid, thereby leading to homogenization by turbulent mixing.

2. A method according to claim 1, in which the ratio of larger diameter to initial diameter is 1.2:1 to 2.5:1.

3. A flow meter for measuring the flow of a multiphase fluid without imposing a physical obstruction to the flow of said fluid comprising:

an upstream pipe length with a first section having a substantially uniform initial internal diameter, said upstream pipe length being free of physical obstructions to said fluid flow;

a step change in cross-section from said substantially uniform initial diameter to a larger internal diameter for homogenizing fluid flow therethrough at the downstream end of said first section;

a pressure-drop flow meter in series with and downstream of said first section, comprising a second pipe section having a smooth change in cross-section from said larger diameter to a smaller diameter and means for measuring the pressure drop of the flow passing through said second pipe section; and a third section of pipe intermediate said pressure-drop flow meter and said first section, said third section of pipe having said larger internal diameter and being free of physical obstructions to said fluid flow.

4. A flow meter according to claim 3, in which the throat of said pressure-drop flow meter is downstream of the step change in cross-section by a distance equivalent to 5 to 20 times the largest diameter of the pipe.

5. A flow meter according to claim 3 in which the ratio of the larger diameter to the initial diameter is 1.2:1 to 2.5:1.

6. A flow meter according to claim 4 in which the ratio of the larger diameter to the initial diameter is 1.2:1 to 2.5:1.

7. A flow meter according to claim 3 in which the throat of said pressure-drop flow meter constricts the pipe diameter from the larger diameter back to the initial diameter.

8. A flow meter according to claim 4 in which the throat of said pressure-drop flow meter constricts the pipe diameter from the larger diameter back to the initial diameter.

9. A flow meter according to claim 5 in which the throat of said pressure-drop flow meter constricts the pipe diameter from the larger diameter back to the initial diameter.

10. A flow meter according to claim 6 in which the throat of said pressure-drop flow meter constricts the pipe diameter from the larger diameter back to the initial diameter.

* * * * *